Oct. 14, 1924. 1,511,550
W. WESTBURY
CLEANER FOR GLASS POTS
Original Filed Aug. 5, 1921
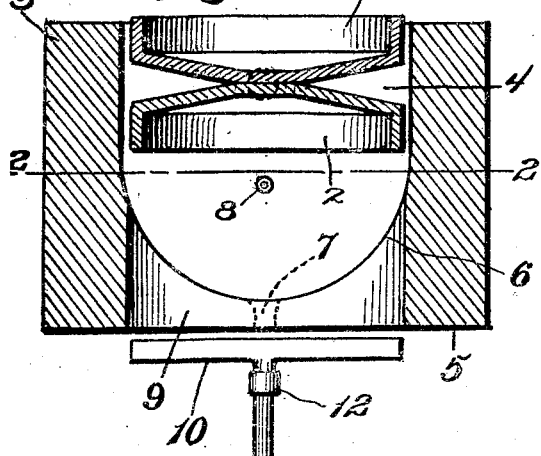
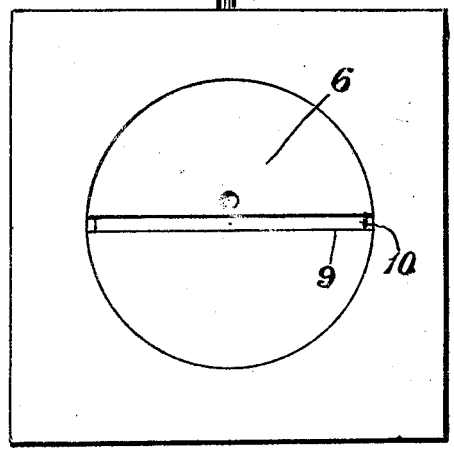
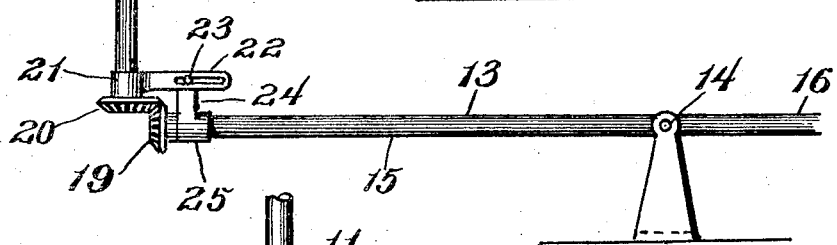
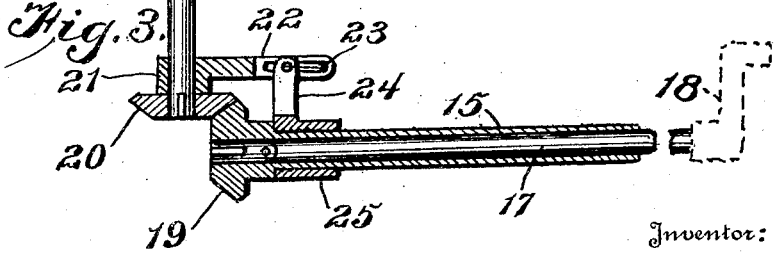
Inventor:
William Westbury,
By C. C. Hines,
Attorney.

Patented Oct. 14, 1924.

1,511,550

UNITED STATES PATENT OFFICE.

WILLIAM WESTBURY, OF INDEPENDENCE, KANSAS, ASSIGNOR TO LAURA ANNA WESTBURY, OF INDEPENDENCE, KANSAS.

CLEANER FOR GLASS POTS.

Application filed August 5, 1921, Serial No. 490,186. Renewed March 11, 1924.

*To all whom it may concern:*

Be it known that I, WILLIAM WESTBURY, a citizen of the United States, residing at Independence in the county of Montgomery and State of Kansas, have invented new and useful Improvements in Cleaners for Glass Pots, of which the following is a specification:

This invention relates to cleaners for glass pots and particularly to pots of that class designed to hold a charge of molten glass from which glass in suitable form for the production of window glass is to be drawn.

More particularly my invention relates to a cleaner for glass pots, of either single or double form, and of that type in which the pot is reversed after use for the melting out of the aftermath by the heat of a melting furnace into which the pot is lowered.

When the pot is so inverted for the melting out of the aftermath, the melted glass residuum trickles down the sides of the pot, forming "teats" which cling to the rim edge of the pot and which, if not removed, and if allowed to remain and mingle with the fresh charge of glass when the pot is again turned up and refilled, will cause unequal expansion and contraction of the pot and damage thereto as well as the production of blisters and other defects in the drawn cylinder.

The object of the present invention is to provide a cleaner of simple and effective construction whereby, when the pot is inverted, the "teats" and other surplus glass from the preceding draw may be readily and conveniently removed, thereby practically or wholly eliminating the objections referred to.

The invention consists of the features of construction, combination and arrangement of parts, hereinafter fully described and claimed, reference being had to the accompanying drawing, in which:

Figure 1 is a sectional view through a melting kiln and double reversible pot and showing in side elevation the cleaner in operative position thereto.

Figure 2 is a horizontal section on line 2—2 of Figure 1.

Figure 3 is a sectional view through parts of the cleaner.

In carrying my invention into practice I provide a glass drawing pot, either of single or double form, as desired, a double pot being shown in the present instance comprising the pot members 1 and 2. These pot members have their glass receiving chambers facing in opposite directions and their bottom portions arranged in apposition or facing each other. The two pot members are suitably mounted in practice for raising and lowering movements in unison, and also for a tilting motion on a suitable supporting axis, whereby the pots may be alternately turned up and reversed, respectively, into working and draining positions. Any of the ordinary constructions in use for raising and lowering and inverting the pot may be employed, a showing of the same being omitted as not necessary to a full and clear understanding of my invention.

The pot is arranged for cooperation with a melting kiln or furnace 3. This furnace 3, which is constructed of suitable refractory material, is provided in its upper portion with a melting chamber 4 terminating above the base 5 of the furnace body in a bottom wall 6 which is bowl-shaped or of substantially hemispherical form. This bottom portion 6 may be of some considerable depth and provides drain surfaces sloping toward drain outlets 7 provided for the discharge of the melted refuse glass or aftermath.

Above its bottom wall 6 the chamber 4 is of sufficient depth to substantially receive both pot members 1 and 2 which when lowered thereinto, as shown in Figure 1, will bring one of the pot members, as the pot member 1, into upright position to be filled and employed in the drawing action and the pot member 2 in inverted position for the melting of the aftermath therefrom by the heat of one or more gas burners 8 extending into the kiln chamber. When so disposed, it will be apparent that the upright pot member 1 will also be in position to be heated for the purpose of keeping the charge of glass therein at the proper temperature and in a properly liquefied state. The pot is adapted to be raised from the position shown to an elevation clear of the top of the kiln body so that it may be rotated on its axis to relatively invert the pots, that is, bring the pot member 2 into an upright position for use and the pot member 1 into an inverted draining position, after which said pot members are lowered into the kiln chamber for the performance of these operations as will be readily understood.

In melting the refuse glass or aftermath from an inverted pot, as the pot 2, it is well known that the molten glass remaining at the last of the draining period trickles from the pot chamber in many streams downward and clings to the rim edge of the pot forming teats or icicle-like appendages which normally remain clinging to the pot rim. These appendages being composed of soft glass fall back into the pot chamber when the pot is turned to an upright position for refilling and partially mingle with the fresh charge of glass in the pot, and partially contact with the walls of the pot and insulate the fresh charge of glass therefrom. As a result checking and cracking of the pot quickly occurs, on account of the unequal temperatures to which it is subjected, and the presence of the particles of refuse glass in the pot cause the production of blisters and other imperfections in the cylinder being drawn. My present invention provides a device which is movable into and out of working position through the bottom portion of the kiln or furnace 3 and is adapted to be brought into contact with the rim of the inverted pot and operated to remove the aforesaid teats or appendages therefrom, thus preventing or reducing to a minimum the objections above referred to.

The base of the kiln 3 is provided with a diametrically arranged slot or passage 9 extending from its lower face 5 upwardly to and through the bowl-shaped bottom 6 of the pot chamber 4, said slot 9 thus communicating at its top portion with the bottom of the melting chamber 4. Arranged so as to be moved upwardly and downwardly through the slot 9 is a cleaner 10 in the form of a rotary scraper blade of proper width and diameter to freely pass through the slot 9 and of a length conforming to the outside diameter of the pot rim. This scraper blade 10 is arranged in T-formation upon the upper end of a scraper carrying shaft 11 which is vertically movable and rotatable in suitable bearing guides 12. The shaft 11 is adapted to be raised to project the scraper blade 10 through the slot 9 into contact with the rim of the inverted pot 2 at the conclusion of the draining operation and rotated to cause said scraper blade to turn in contact with the rim of the body and remove the appendages of glass therefrom. The shaft 11 and scraper blade 10 are then lowered to a normal position beneath the kiln, so as to lie outside and be protected from the heat of the furnace, or until their use is again required. It will thus be understood that each time a pot is inverted into draining position, the scraper may be employed, at the termination of the draining period, to remove the glass particles adhering to the rim of the pot and to scrape the same clean, thus removing from the pot all of the particles of glass liable to cause subsequent annoyances, inconveniences and defects in the pot and glass such as have been previously described.

Any suitable means for raising and lowering and rotating the scraper blade 10 may be employed. In the present instance I have shown a tilting tubular support 13 pivotally mounted at an intermediate point in its length, as at 14, to provide oppositely projecting arm portions 15 and 16. Extending through and journalled in said tubular support is an operating shaft 17 which projects at both ends beyond the opposite ends of the tubular support. The arm 16 of the support provides a handle or lever member whereby the arm 15 may be raised and lowered to raise and lower the shaft 11 and scraper 10, while the arm 15 of the tubular support is suitably coupled to the shaft 15 for communicating raising and lowering motion thereto. The end of the shaft 15 which projects beyond the arm 16 may be provided with or coupled to any suitable driving means, such as an operating handle or crank 18, while the end of the shaft 17 which projects beyond the end of the arm 15 carries a bevel gear 19 meshing with a bevel gear 20 on the lower end of the shaft 11 whereby said shaft 11 may be driven to rotate the scraper 10 and to properly adjust or dispose said scraper for registry and movement through the slot 9. The gear 20 is fixed to the shaft 11 and slidably engaging said shaft is a sleeve 21 carrying a forked portion 22 the arms of which are slotted to receive pins 23 upon fork arms 24 carried by a sleeve 25 fixed to or having a limited sliding movement on the arm 15 of the tubular support 13. This construction provides a pivotal slip-joint connection between the arm 15 and shaft 11 whereby said arm 15 is adapted to swing in an arc and to transmit motion to the shaft 11 in a straight line. Any suitable means may be provided for ensuring the maintenance of the gear 19 in mesh with the gear 20 in a proper way in the raised position of the shaft 11, the gear 19 being shown in the present instance, for such purpose, pivoted, as at 22, to the end of the shaft 17 to adapt it to tilt to maintain its proper angular relationship to the gear 20, in which tilting action of the gear 19 the shaft 17 may have a desired range of inward and outward sliding movement. Other means for connecting the scraper with the adjusting device 13 may, however, be employed, and any other type of adjusting device and gearing for adjusting and driving the scraper may be employed within the spirit and scope of the invention as defined in the appended claims.

From the foregoing description, the construction and mode of operation of my pot cleaner will be readily understood and it will be seen that the invention provides a device of the character and for the purpose set forth which is not only simple, reliable and efficient in construction, but which affords a means whereby the inverted pot at the end of the draining period, and while still exposed to the direct heat of the melting furnace, may be cleaned to remove the adhering particles of glass which cause the troubles mentioned. Also it will be understood that such a device may be installed for use in connection with existing styles of single and double reversible pots by the use of a modified form of melting kiln or furnace constructed in accordance with my invention.

Having thus fully described my invention, I claim:

1. In combination with a melting kiln, and a pot adapted to be disposed in inverted position therein, a scraper for removing glass from the inverted pot within the kiln, and means for actuating said scraper.

2. In a cleaner for glass pots, the combination with a reversible pot, and means for heating the same when in inverted draining position, of a cleaner movable into engagement with a surface of the pot and operable for removing adhering glass therefrom.

3. In a cleaner for glass pots, the combination of a melting kiln or furnace having a melting chamber, a reversible pot vertically movable into and out of said chamber and rotatable upon its axis between drawing and draining positions, a scraper vertically movable in the furnace toward and from the rim surface of the pot, and means for operating said scraper for a cleaning action.

4. In a cleaner for glass pots, the combination of a melting kiln or furnace having a melting chamber, a pot vertically movable into and out of said chamber and rotatable upon an axis between drawing and draining positions, a vertically movable and rotatable scraper, means for raising and lowering said scraper to move it toward or from the rim of the inverted pot, and means for rotating said scraper to remove the glass from the pot rim.

5. In a cleaner for glass pots the combination of a melting kiln or furnace having a melting chamber, and having a slot in its bottom communicating with said chamber, a pot vertically movable into and out of the melting chamber and rotatable upon an axis between drawing and draining positions, a scraper movable vertically through the slot into and out of contact with a surface of the inverted pot, means for raising and lowering said scraper, and means for rotating the same.

6. In a cleaner for glass pots, the combination of a reversible pot, means for heating the inverted pot for a draining action, and means movable into and out of engagement with the surface of the inverted pot and operable for a scraping action for removing glass therefrom.

7. In a cleaner for glass pots, the combination of a melting kiln or furnace having a melting chamber in the top thereof and drain outlets and a guide slot in the bottom thereof, a reversible pot movable vertically into and out of said chamber, a scraper movable vertically through the slot into and out of contact with a surface of the inverted pot, a tilting element for raising and lowering said scraper, and means for rotating the scraper for a cleaning action.

8. In combination with a melting kiln, and a pot adapted to be disposed in inverted position therein, a rotary scraper for removing glass from a surface of the inverted pot, and means for rotating said scraper.

9. In combination with a melting kiln, and a pot adapted to be disposed in inverted position therein, a rotary scraper for removing glass from a surface of the inverted pot, means for moving said scraper toward or away from said pot surface, and means for rotating said scraper for a scraping action.

10. In combination with a melting kiln, and a pot adapted to be disposed in inverted position therein, a cleaner movable into and out of operative position with relation to a surface of the pot to be cleaned, and means for imparting motion to said cleaner for removing glass adhering to said pot surface.

In testimony whereof I affix my signature.

WILLIAM WESTBURY.